3,265,447
CONTROL VALVE
Richard C. Bueler, Glendale, Mo., assignor to Wagner Electric Corporation, St. Louis, Mo., a corporation of Delaware
Filed Mar. 3, 1965, Ser. No. 436,737
18 Claims. (Cl. 303—52)

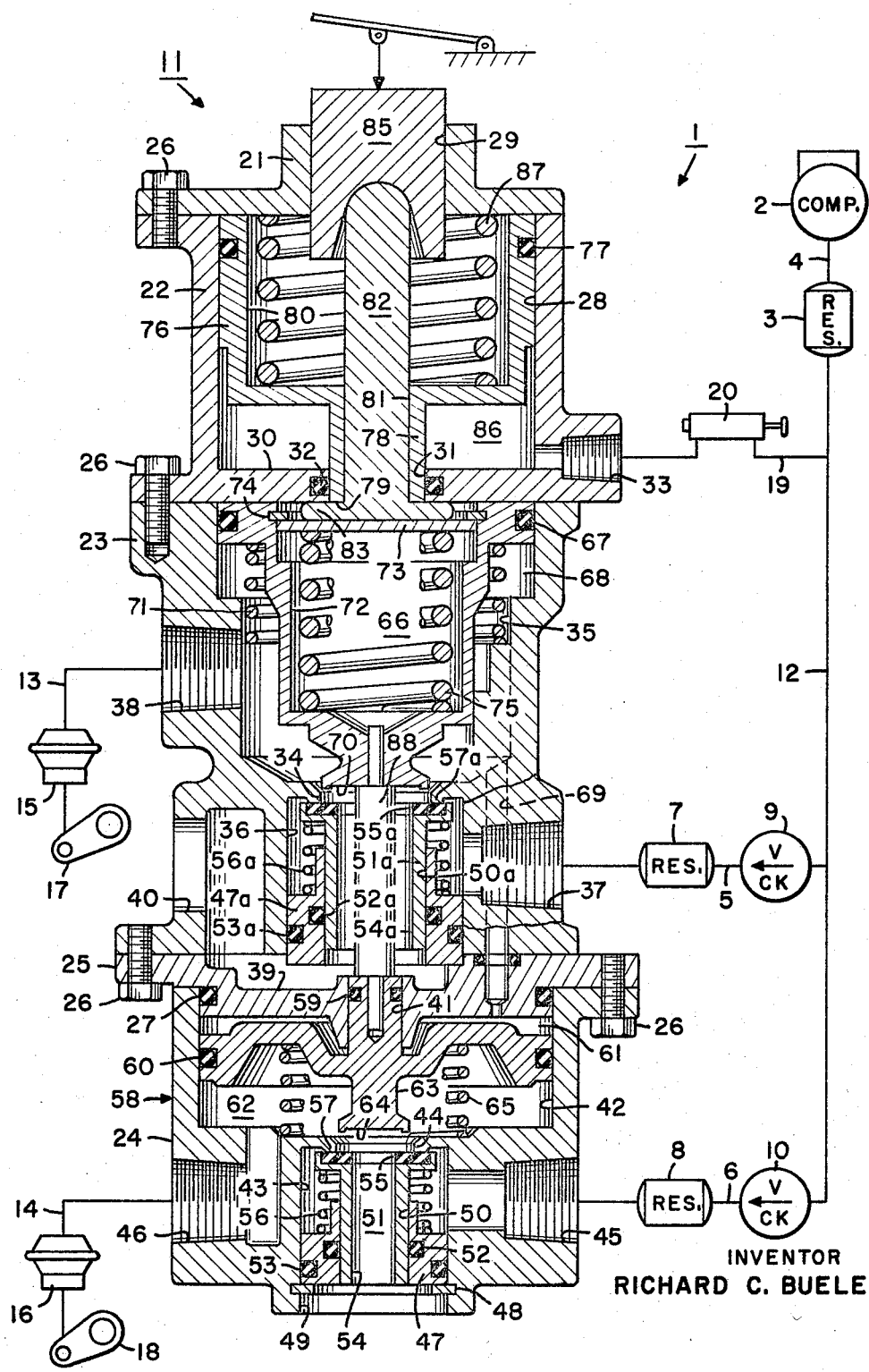

This invention relates to control valves for vehicles and in particular to emergency means in said control valves to effect automatic actuation thereof.

In the past, various types of single or dual or tandem control valves were utilized to effect the energization of single or dual fluid pressure systems, such as those utilized on tractor vehicles or tractor-trailer vehicle combinations; however, an undesirable or disadvantageous feature of such past control valve and systems was manifested in the inability of the vehicle operator to actuate said control valves and systems in the event the operator treadle or treadle linkage to said control valves was lost, disengaged, broken, or for some other reason became inoperable to effect the actuation of said control valves and the resulting energization of said systems.

The object of the present invention is to provide a novel control valve which overcomes the aforementioned undesirable or disadvantageous feature, as well as other undesirable and disadvantageous features, and this and other objects and advantageous features of the present invention will become apparent hereinafter.

Briefly, one form of the invention embodies a control valve including a housing having application means movable therein to effect the application of pressure fluid flow therethrough, resiliently urged means defining with said housing an expansible fluid pressure chamber, said resiliently urged means being movable in said housing in response to fluid pressure in said chamber less than a predetermined value to automatically drive said application means and effect the application of fluid pressure through said housing, and operator controlled means extending through said resiliently urged means and normally movable in response to an applied force to actuate said application means.

In the drawing which illustrates an embodiment of the invention,

The drawing illustrates a diagrammatic view of a fluid pressure system having control valve means therein in cross-section embodying the present invention.

Referring now to the drawing in detail, a fluid pressure system 1 is shown having fluid pressure generating means, such as a compressor 2, connected with a system or main reservoir 3 by a conduit 4. Branch conduits 5, 6 having branch reservoirs 7, 8 and uni-directional flow valves 9, 10 respectively interposed therein are connected between a pair of inlet ports provided in a control valve 11 and a conduit 12 which is connected with the reservoir 3. The control valve 11 is also provided with a pair of outlet ports which are connected by conduits 13, 14 to brake chambers 15, 16, said brake chambers being in turn operatively connected with slack adjustors 17, 18 to control the energization of friction devices or wheel brake assemblies on separate vehicle axles (not shown). To complete the description of the system 1, another conduit 19 has one end connected with the conduit 12 in open pressure fluid communication with the reservoir 3 while the other end connects with an emergency port also provided in the control valve 11, and a push-pull valve 20 of the type well known to the art is interposed in said conduit 19, said push-pull valve being movable between a connecting position providing open pressure fluid communication through the conduit 19 between the emergency port of the control valve 11 and the conduit 12 and a venting position interrupting such pressure fluid communication and venting said emergency port to the atmosphere.

The control valve 11 is provided with a closure member 21, upper, intermediate and lower housings 22, 23, 24 and a connecting plate 25 which are interconnected by suitable means, such as a plurality of studs 26, and a seal 27 is sealably disposed between said lower housing and connecting plates 24, 25.

The upper housing 22 is provided with a counterbore 28 which is closed at the upper end thereof by the closure member 21, and an axial bore or guide aperture 29 is provided through said closure member connecting with said counterbore. The upper housing 22 is also provided with a radially extending wall 30 at the other or lower end of the counterbore 28, said wall having an axial bore 31 therethrough in which is disposed a sealing member 32. An emergency port 33 which receives the conduit 19, as previously mentioned, is provided in the upper housing 22 connecting with the counterbore 28 adjacent to the radially extending wall 30.

The intermediate housing 23 is provided with a connecting bore 34 axially interposed between a stepped upper counterbore 35 and a lower counterbore 36, and a set of inlet and outlet ports 37, 38 which receive conduits 5, 13, as previously mentioned, are provided in said intermediate housing connected with said lower and upper counterbores, respectively. The connecting plate 25 is recessed at 39, and said recess connects the lower counterbore 36 with an exhaust port or passage means 40 which is provided in the intermediate housing 23. The connecting plate 25 is also provided with a centrally located bore or aperture 41 therethrough which connects with an upper counterbore 42 provided in the lower housing 24, and said upper counterbore 42 is connected with a lower counterbore 43 by a connecting bore 44 provided therebetween in said lower housing. Another set of inlet and outlet ports 45, 46 which receive conduits 6, 14, as previously mentioned, are provided in the lower housing 24 respectively connecting with the counterbores 43, 42.

A pair of valve guide members 47, 47a are respectively positioned in the lower and intermediate housing counterbores 43, 36, said valve guide member 47a normally being seated in displacement preventing engagement with the connecting plate 25 and said valve guide member 47 being seated in displacement preventing engagement with a snap ring and groove assembly 48 provided adjacent the lower end of the counterbore 43. The lower end of the counterbore 43 also defines an exhaust port 49. The valve guide members 47, 47a are provided with axial bores 50, 50a in which valve elements 51, 51a are slidably received, and seals 52, 52a and 53, 53a are carried in said valve guide members in sealing engagement with said valve elements and the lower and intermediate housing counterbores 43, 36, respectively. The valve elements 51, 51a are provided with axial exhaust openings or passages 54, 54a therethrough normally providing pressure fluid communication between the lower housing outlet and exhaust ports 46, 49 and between the intermediate housing outlet and exhaust ports 38, 40, respectively, and annular resilient seals or discs 55, 55a are provided on the upper ends of said valve elements in circumscribing relation with said exhaust openings. Valve springs 56, 56a are biased between said valve guide members 47, 47a and the valve elements 51, 51a normally urging the valve element seals 55, 55a into sealing engagement with valve seats 57, 57a provided on the lower and intermediate housings 24, 23 in circumscribing relation with the connecting bores 44, 34 thereof, and in this manner said valve elements normally interrupt pressure fluid communication between the lower housing inlet and outlet ports 45, 46 and between the intermediate housing inlet and outlet ports 37, 38, respectively.

A stepped application member or relay piston, indicated generally at 58, is slidable in the lower housing counterbore 42 and the connecting plate bore 41 and carries peripheral seals 59, 60 in sealing engagement with said connecting plate bore and lower housing counterbore, respectively. An expansible application chamber 61 is defined in the lower housing counterbore 42 between the upper end of the relay piston 58 and the connecting plate 25, and the lower end of said relay piston defines with said lower housing counterbore an outlet chamber 62 in pressure fluid communication with the outlet port 46. An extension 63 is provided on the lower end of the relay piston 58 having a valve seat 64 on the free end thereof for operative engagement with the valve element 51, and a return spring 65 is biased between said relay piston and the lower housing 24 normally urging said relay piston toward engagement with the connecting plate 25 and spacing said relay piston valve seat 64 from said valve element 51.

Another stepped application member or reaction piston, indicated generally at 66, is slidable in the intermediate housing counterbore 35 and carries a peripheral seal 67 in sealing engagement with said intermediate housing counterbore. The reaction piston defines another outlet chamber 68 in the intermediate housing counterbore 35 which is connected in pressure fluid communication with the outlet port 38, and aligned passages 69 are provided in the intermediate housing 23 and the connecting plate 25 in open pressure fluid communication between the intermediate housing outlet chamber 68 and the lower housing application chamber 61.

The lower or free end of the reaction piston 66 defines a valve seat 70 for operative engagement with the valve element 51a, and a return spring 71 is interposed between the intermediate housing 23 and said reaction piston normally urging said reaction piston toward abutting engagement with the radially extending wall 30 of the upper housing 22 and predeterminately spaces the reaction piston valve seat 70 from said valve element 51a. A stepped metering spring bore 72 is axially provided in the reaction piston 66, and a spring retainer or guide 73 is slidable in the bore 72 being retained therein against displacement by a snap ring and groove assembly 74 provided adjacent to the upper end of the bore 72. The spring retainer 73 is normally urged into abutment with the snap ring 74 by the compressive force of a metering spring 75 which is pre-compressed between said retainer 73 and the lower end of the metering spring bore 72.

Another application member or emergency piston 76 is slidable in the upper housing counterbore 28 having a peripheral seal 77 in sealing engagement with said upper housing counterbore, and an extension 78 is integrally provided on said piston 76, said extension being slidably received in the bore 31 of the upper housing wall 30 in sealing engagement with the seal 32 and having a lower or free end 79 extending into the intermediate housing counterbore 35 for driving engagement with the reaction piston 66. Stepped bores 80, 81 are axially provided through the emergency piston and extension 76, 78, and a push rod member 82 is slidably received in the emergency piston stepped bore 81. A displacement preventing flange 83 is provided on the lower end of the push rod member 82 normally in abutting engagement between the extension lower end 79 and the metering spring retainer 73 of the reaction piston 66, and the upper end 84 of said push rod member is pivotally received in a guide piston 85 which is slidable in the closure member bore 29 in response to an operator applied force thereon. Although not shown, it should be noted that the displacement preventing flange can be provided on the guide piston for displacement preventing engagement with the closure member 21 instead of on the lower end of the push rod member 82 wherein the extension free end 79 could then be directly engaged with the metering spring retainer 73 along with the lower end of said push rod member. An expansible fluid pressure chamber 86 is provided in the upper housing counterbore 28 between the emergency piston 76 and the upper housing wall 30 in open pressure fluid communication with the emergency port 33, and an emergency spring 87 is biased between said emergency piston and the closure member 21 in opposition to fluid pressure expansion of said emergency chamber 86. To complete the description of the control valve 11, an abutment member or force transmitting linkage 88 is provided between the lower or free end of the reaction piston 66 and the upper end of the relay piston 58, said member 88 extending axially through the exhaust opening 54a of the valve element 51a and the recess 39 of the connecting plate 25.

Under normal operating conditions with the push-pull valve 20 in the connecting position thereof connecting the emergency chamber 86 of the control valve 11 with the main reservoir 3, fluid pressure generated by the compressor 2 flows through the conduit 4, the main reservoir 3, the conduit 12 and therefrom through the conduit 19, the push-pull valve 20, and the emergency port 33 of the control valve 11 into the emergency chamber 86. The fluid pressure so established in the emergency chamber 86 and acting on the effective area of the emergency piston 76 therein creates an emergency force in opposition to the compressive force of the emergency spring 87, and when the fluid pressure in said emergency chamber exceeds a predetermined value, the magnitude of the emergency force overcomes the compressive force of said emergency spring to move said emergency piston upwardly toward an inoperative position in abutment with the closure member 21. The generated fluid pressure also flows from the conduit 12 through the branch conduits 5, 6 and the check valves 9, 10 therein into the branch reservoirs 7, 8, respectively, and fluid pressure also flows from the branch reservoirs 7, 8 through said branch conduits 5, 6 to the inlet ports 37, 45 of the control valve 11 and therefrom into the inlet chambers 36, 43 thereof. From the foregoing, it is apparent that the branch reservoirs 7, 8 are protected reservoirs since the uni-directional flow valves 9, 10 protect said branch reservoirs against fluid pressure loss therefrom due to a malfunctioning compressor and/or leaks in the system 1 ahead of said branch reservoirs. With the fluid pressure so established in the main and branch reservoirs 3, 7, 8 and in the emergency chamber 86 of the control valve 11, the component parts of said control valve are now positioned as shown in the drawing.

If the operator desires to effect a braking application under normal operating conditions, a manually applied force on the guide piston 85 is transmitted through the push rod 82 and the retainer and metering spring 73, 75 to the reaction piston 66 and therefrom through the connecting rod 88 to the relay piston 58; therefore, said reaction and relay pistons are normally concertly movable in response to the applied force downwardly against the compressive forces of the return springs 65, 71. This downward movement initially engages the reaction piston valve seat 70 with the valve element 51a closing the exhaust opening 54a therein and isolating the outlet chamber 68 from the atmosphere while also moving the relay piston valve seat 64 toward an advanced position juxtaposed with the valve element 51; however, since the travel between said relay piston valve seat 64 and said valve element 51 is predeterminately greater than that between said reaction piston valve seat 70 and said valve element 51a, said valve element 51 is not actuated by the applied force under normal operating conditions. Further downward movement of the reaction piston 66 urges the valve element 51a against the valve spring 56a to a position disengaged from the intermediate housing valve seat 57a to establish pressure fluid communication between the inlet and outlet ports 37, 38. The pressure fluid flows from the inlet port 37 through the inlet chamber 36, the connecting bore 34, the outlet chamber 68 and the outlet port 38 into the service line 13 to actuate the brake chamber 15 which, in turn, rotates the slack adjustor 17 to energize the wheel brake assembly associated therewith. At the same time, the fluid pressure so established in the outlet chamber 68 also flows therefrom through the housing passage 69 into the application chamber 61 and acts on the effective area of the relay piston 58 therein to create an application force which moves said relay piston from the advanced position thereof to engage the relay piston valve seat 64 with the valve element 51 thereby closing the valve element exhaust opening 54 and isolating the outlet chamber 62 from the atmosphere. Further downward movement of the relay piston 58 moves the valve element 51 against the valve spring 56 to a position disengaged from the lower housing valve seat 57 and establishing pressure fluid communication between the inlet and outlet ports 45, 46. Pressure fluid also flows from the inlet port 45 through the inlet chamber 43, the connecting passage 44, the outlet chamber 62 and the outlet port 46 into the service line 14 to actuate the brake chamber 16 which, in turn, rotates the slack adjustor 18 to energize the wheel brake assembly associated therewith. Of course, when the relay piston 58 is moved in response to fluid pressure in the application chamber 61, the applied force transmission of the connecting rod 88 is interrupted.

When the reaction force created by the established fluid pressure in the outlet chamber 68 acting on the effective area of the reaction piston 66 equals the manually applied force, said reaction piston is moved upwardly against the metering spring 75 wherein the valve element 51a is positioned in lapped engagement with the housing valve seat 57a and the reaction piston valve seat 70 is positioned in lapped engagement with said valve element 51a. The reaction force acting through the metering spring 75, the retainer 73 and the push rod 82 and guide piston 85 against the manually applied force affords the operator a direct and accurate "feel" as to the extent of the braking effort or application. Similarly, when the reaction force created by the established fluid pressure in the outlet chamber 62 acting on the effective area of the relay piston 58 therein equals the application force, said relay piston is moved upwardly wherein the valve element 51 is positioned in lapped engagement with the lower housing valve seat 57 and the relay piston valve seat 64 is positioned in lapped engagement with said valve element 51. If greater braking effort is desired, the manually applied force is increased, which results in an increased application force, and the component parts of the control valve 11 function in the same manner as previously described to again move said component parts to their lapped positions.

When the desired braking effort is attained, the manually applied force is removed from the reaction piston 66 and the return spring 71 moves said reaction piston upwardly toward its original position while the compressive force of the metering spring 75 also serves to return the retainer 73, the push rod 82 and guide piston 85 toward their original positions. Upward movement of the reaction piston 66 disengages the valve seat 70 thereof from said valve element 51a to re-establish communication between the outlet port 38 and the atmosphere and de-energizes the wheel brake assemblies associated therewith by exhausting fluid pressure from the brake chamber 15 through the conduit 13, said outlet port, the outlet chamber 68, the valve element exhaust opening 54a and the connecting plate recess 39 to the exhaust port 40. At the same time, fluid pressure is also exhausted from the application chamber 61 through the housing passages 69 into the outlet chamber 68 and therefrom to atmosphere, as previously described. Upon the elimination of the application force, the compressive force of the return spring 65 moves the relay piston 58 upwardly toward its original position. The upward movement of the relay piston 58 disengages the valve seat 64 thereof from said valve element 51 to re-establish pressure fluid communication between said outlet port 46 and the atmosphere and de-energize the wheel brake assemblies associated therewith by exhausting fluid pressure from the brake chamber 16 through the conduit 14, said outlet port, the outlet chamber 62 and the valve element exhaust opening 54 to the exhaust port 49.

Under emergency conditions when the fluid pressure in the main reservoir 3 is reduced or lost due to a malfunctioning compressor and/or leaks or the like in the system 1 ahead of the protected reservoirs 7, 8, the fluid pressure in the emergency chamber 86 of the control valve 11 is correspondingly reduced along with the emergency force acting on the emergency piston 76. When the fluid pressure in the emergency chamber 86 is reduced to a predetermined minimum value, the compressive force of the emergency spring 87 overcomes the opposing reduced emergency force and moves said emergency piston downwardly in the upper housing counterbore and bore 28, 31. Since the lower end 79 of the emergency piston extension 78 in the intermediate housing counterbore 35 is normally drivingly engaged with the reaction piston 66 in the inoperative position thereof, the downward movement of the emergency piston 76 mechanically drives the reaction piston 66 to actuate the valve element 51a and automatically establishes pressure fluid communication between the inlet and outlet ports 37, 38, and the relay piston 58 is also movable in response to established fluid pressure at the outlet port 38 transmitted through the housing passages 69 into the application chamber 61 to also actuate the valve element 51 and automatically establish pressure fluid communication between the inlet and outlet ports 45, 46, as previously described in detail hereinabove. Since the protected reservoirs 7, 8 are protected against depletion or reduction of the fluid pressure therein by the unidirectional check valves 9, 10 when the fluid pressure in the main reservoir 3 is reduced or depleted, it is obvious that such emergency or automatic energization of the wheel brake assemblies under these emergency conditions is effected under full reservoir pressure from the protected reservoirs 7, 8.

In the event that the operator treadle or treadle linkage is lost, broken, disengaged from the control valve 11 or for some other reason becomes inoperative for transmitting the operator applied force, the operator can manually actuate the system 1 to effect or simulate emergency conditions by manually moving the push-pull valve 20 from the connecting position to the venting position thereof to interrupt pressure fluid communication between the emergency chamber 86 and the main reservoir 3 and vent said emergency chamber to the atmosphere. When the system 1 is manually actuated in this manner to simulate emergency conditions, the emergency force is eliminated, and the emergency spring 87 drives the emergency piston 76 downwardly to actuate the reaction piston and relay piston 66, 58, as previously described hereinabove.

In the event of fluid pressure failure due to leaks or the like in one of the branch systems connected with the branch reservoirs 7, 8, it is obvious that the fluid pressure in the main reservoir will be thereby reduced in an attempt to replenish the depleted fluid pressure in the leaking one of the branch reservoirs 7, 8. Therefore, when the fluid pressure in the main reservoir 3 is so reduced to the aforementioned predetermined minimum value, the emergency piston 76 is moved by the emergency spring 87 to effect the automatic actuation of the relay and reaction pistons 58, 66 and their associated valve elements 51, 51a and establish pressure fluid communication between the inlet and outlet ports 45, 46 and 37, 38, respectively. In this manner, at least one of the wheel brake assemblies is energized in the emergency condition. Further, in the event of fluid pressure failure at the outlet port 38, the connecting rod 88 serves to mechanically actuate the relay piston 58 and valve element 51 to insure the establishment of fluid pressure between the inlet and outlet ports 45, 46.

From the foregoing, it is obvious that a novel control valve meeting the objects and advantages set out hereinbefore, and others, is provided in that changes or modifications to the precise configurations, shapes or details of the construction of said control valve set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a pressure fluid flow passage therethrough, application means movable in said housing and controlling said flow passage, resiliently urged means movable in said housing for driving engagement with said application means and defining with said housing an expansible fluid pressure chamber and operator controlled means having one portion extending through said resiliently urged means for driving engagement with said application means and having a force receiving portion for receiving an applied force from exteriorly of said housing, said operator controlled means being movable in response to an applied force on the force receiving portion thereof to drive said application means toward an actuated position in said flow passage establishing pressure fluid flow therethrough, and said resiliently urged means being movable in response to fluid pressure in said chamber less than a predetermined value to drive said application means independently of the applied force toward the actuated position thereof in said flow passage to automatically establish pressure fluid flow therethrough.

2. The control valve according to claim 1 comprising another pressure fluid flow passage through said housing, other application means movable in said housing and controlling said other flow passage, abutment means between said first named and other application means and providing movement of said other application means toward a position in said other flow passage establishing pressure fluid flow therethrough upon the resiliently urged means movement of said first named application means.

3. The control valve according to claim 1 wherein said resiliently urged means includes piston means movable in said housing and defining therewith said chamber, extension means on said piston means and extending exteriorly of said chamber for driving engagement with said application means, and spring means engaged between said housing and said piston means in opposition to fluid pressure expansion of said chamber.

4. The control valve according to claim 3 wherein said operator controlled means includes push rod means extending through said piston means and extension means, said push rod means having opposed ends respectively defining said force receiving portion and said driving portion.

5. The control valve according to claim 2 comprising another expansible fluid pressure chamber defined between said other application means and said housing and opposing said other flow passage, passage means for transmitting the established fluid pressure in said first named flow passage into said other chamber, said other application means being normally movable in response to the established fluid pressure in said other chamber toward its actuated position, and said abutment means also providing movement of said other application means toward its actuated position in response to the applied force movement of said first named application means toward its actuated position in the event of pressure fluid failure in said first named flow passage.

6. A control valve comprising a housing having inlet and outlet ports therein, valve means controlling pressure fluid communication between said inlet and outlet ports, a valve control member movable in said housing for operative engagement with said valve means, resiliently urged means movable in said housing for driving engagement with said valve control member and defining with said housing an expansible fluid pressure chamber, and operator controlled means extending through said resiliently urged means and having opposed portions on opposite sides of said resiliently urged means, one of said opposed portions being provided to receive an operator applied force thereon and the other of said opposed portions being drivingly engaged with said valve control member, said operator controlled means being movable in response to the applied force on the applied force receiving portion thereof to initially drive said valve control member into engagement with said valve means and thereafter drive said valve means toward a position establishing pressure fluid communication between said inlet and outlet ports, and said resiliently urged means being movable in response to fluid pressure in said chamber less than a predetermined value to drive said valve control member and actuate said valve means thereby automatically establishing pressure fluid communication between said inlet and outlet ports independently of the applied force.

7. The control valve according to claim 6 comprising other inlet and outlet ports in said housing, other valve means controlling pressure fluid communication between said other inlet and outlet ports, another valve control member movable in said housing for operative engagement with said other valve means, and a mechanical connection between said first named and other valve control members providing concerted movement of said other valve control member with first named valve control member to engage and move said other valve means to a position establishing pressure fluid communication between said other inlet and outlet ports upon the resiliently urged means movement of said first named valve control member.

8. A control valve according to claim 7 wherein said other valve control member defines with said housing another expansible fluid pressure chamber connected in pressure fluid communication with said first named outlet port, said other valve control member being normally movable in response to the established fluid pressure at said first named outlet port to actuate said other valve means, and said mechanical connection also being responsive to the applied force movement of said first named valve control member to actuate said first named valve means to mechanically drive said other valve control member and actuate said other valve means in the event of failure of the established fluid pressure at said first named outlet port.

9. The control valve according to claim 6 comprising a valve seat on said housing between said inlet and outlet ports, said valve means being normally urged into engagement with said valve seat to interrupt pressure fluid communication between said inlet and outlet ports and said valve means being moved to a position disengaged from said valve seat and establishing pressure fluid communication between said inlet and outlet ports upon the applied force movement and the resiliently urged means movement of said valve control member.

10. The control valve according to claim 6 wherein said resiliently urged means includes piston means movable in said housing and defining therewith said chamber, extension means on said piston means and extending exteriorly of said chamber for driving engagement with said valve control member, and spring means engaged between said housing and said piston means in opposition to fluid pressure expansion of said chamber.

11. The control valve according to claim 10 wherein said operator controlled means includes push rod means extending through said piston means and extension means and having opposed ends, one of said opposed ends defining said applied force receiving portion and the other of said opposed ends defining said driving portion and being drivingly engaged with said valve control member.

12. The control valve according to claim 9 comprising a pair of stepped bores in said housing, said resiliently urged means including a piston slidable in the larger of said stepped bores and defining therein said chamber, emergency spring means biased between said piston and said housing and urging said piston in a direction to oppose fluid pressure expansion of said chamber, said piston being movable against said spring means toward an inoperative position in abutment with said housing when the fluid pressure in said chamber exceeds the predetermined value, pre-compressed metering spring means contained in said valve control member, an extension on said piston slidable in the smaller of said stepped bores and having a free end thereon exteriorly of said chamber for driving engagement with said metering spring means, said emergency spring means urging said piston and extension from the inoperative position thereof when the fluid pressure in said chamber is reduced below the predetermined value to drive said valve control member and automatically actuate said valve means and said valve control member being movable against said metering spring means in response to the established fluid pressure at said outlet port and acting on said valve control member in opposition to said emergency spring means to permit movement of said valve means to a lapped position between said valve control member and said valve seat, another stepped bore extending through said piston and extension means, and said operator controlled means including a push rod slidable in said stepped bore and having opposed ends, one of said opposed ends defining said force receiving portion and extending exteriorly of said housing to receive the applied force thereon and the other of said opposed ends defining said driving portion and extending through the free end of said extension means into driving engagement with said metering spring means.

13. The control valve according to claim 6 comprising a bore and counterbore in said housing having a shoulder therebetween, said resiliently urged means including piston means slidable in said counterbore, said chamber being defined in said counterbore between said piston means and shoulder, extension means on said piston means slidable in said bore and extending therethrough into driving engagement with said valve control member, spring means engaged between an end wall of said counterbore and said piston means urging said piston means toward said shoulder in opposition to fluid pressure expansion of said chamber, and another bore extending through said piston means and extension means, said operator controlled means including push rod means slidable in said other bore and having opposed ends respectively defining said applied force receiving portion and said driving portion.

14. The control valve according to claim 1, comprising selectively operable means, means for connecting said selectively operable means with said chamber, said selectively operable means being movable between a first position subjecting said chamber to fluid pressure and a second position venting said chamber to the atmosphere, said resiliently urged means being movable to actuate said application means in response to fluid pressure in said chamber less than the predetermined value when said selectively operable means is in the first and second positions thereof, respectively.

15. The control valve according to claim 6, comprising a control port in said housing connected with said chamber, and means including selectively operable means connected with said control port, said selectively operable means being movable between one position subjecting said chamber to fluid pressure and another position venting said chamber to the atmosphere, said resiliently urged means being movable to actuate said application means in response to fluid pressure in said chamber less than the predetermined value when said selectively operable means in in the one position thereof and said resiliently urged means also being movable to actuate said application means upon movement of said selectively operable means to the other position thereof.

16. The control valve according to claim 1, comprising means on said driving portion extending into abutting engagement between said resiliently urged means and said application means.

17. The control valve according to claim 6, comprising means on said operator controlled means extending into displacement preventing engagement with said housing.

18. The control valve according to claim 6, comprising flange means on said operator controlled means adjacent to said driving portion thereof and extending into abutting engagement between said resiliently urged means and said valve control member.

References Cited by the Examiner

UNITED STATES PATENTS

| | | | |
|---|---|---|---|
| 2,289,559 | 7/1942 | Turek | 303—63 |
| 3,152,844 | 10/1964 | Bueler | 303—52 |

EUGENE G. BOTZ, *Primary Examiner.*